United States Patent
Culver et al.

(10) Patent No.: US 12,543,722 B2
(45) Date of Patent: Feb. 10, 2026

(54) THERMO-MECHANICAL DEVICE FOR CAPTURING AND EXTERMINATING TICKS

(71) Applicant: Bayshore Innovations LLC, Keasbey, NJ (US)

(72) Inventors: Duncan Culver, Howell, NJ (US); Valerie Ann Montecalvo, Highlands, NJ (US); Frank Charles Montecalvo, Rumson, NJ (US)

(73) Assignee: Bayshore Innovations LLC

( * ) Notice: Subject to any disclaimer, the term of this patent is extended or adjusted under 35 U.S.C. 154(b) by 155 days.

(21) Appl. No.: 17/726,479

(22) Filed: Apr. 21, 2022

(65) Prior Publication Data

US 2022/0354103 A1  Nov. 10, 2022

Related U.S. Application Data

(60) Provisional application No. 63/258,444, filed on May 5, 2021.

(51) Int. Cl.
 *A01M 17/00* (2006.01)

(52) U.S. Cl.
 CPC .................... *A01M 17/00* (2013.01)

(58) Field of Classification Search
 CPC ........ A01M 17/00; A01M 1/023; A01M 1/02; A01M 1/10; A01M 1/103; A01M 1/20; A01M 1/2094; A01M 5/00; A01M 5/02; A01M 5/04; A01M 5/06; A01M 5/08
 See application file for complete search history.

(56) References Cited

U.S. PATENT DOCUMENTS

| | | | | |
|---|---|---|---|---|
| 1,563,668 | A | * | 12/1925 | Smith ..................... A01M 5/04 43/138 |
| 1,948,332 | A | * | 2/1934 | Carter .................... B65G 15/42 474/271 |
| 4,843,752 | A | * | 7/1989 | Munemasa ........... A01M 17/00 43/138 |
| 5,255,469 | A | | 10/1993 | Sukup et al. |
| 5,974,728 | A | | 11/1999 | Nichols |
| 10,021,871 | B1 | | 7/2018 | Cogley |
| 10,729,122 | B1 | | 8/2020 | Simon |
| 2005/0066570 | A1 | | 3/2005 | Mosher, II |
| 2010/0037512 | A1 | | 2/2010 | Durand |
| 2010/0186285 | A1 | * | 7/2010 | Schmitt ................... A01M 1/24 43/132.1 |
| 2015/0082688 | A1 | * | 3/2015 | Schmitz .................... A61L 2/10 43/132.1 |

FOREIGN PATENT DOCUMENTS

| | | | | |
|---|---|---|---|---|
| CN | 111713196 A | * | 9/2020 | |
| RU | 2459409 C2 | | 8/2012 | |
| WO | WO-2020157545 A1 | * | 8/2020 | ............ A01M 19/00 |

OTHER PUBLICATIONS

CN-111713196-A_Machine_Translation (Year: 2020).*

* cited by examiner

*Primary Examiner* — David J Parsley
*Assistant Examiner* — Sahar Almatrahi
(74) *Attorney, Agent, or Firm* — Davidson Kappel LLC

(57) ABSTRACT

A movable arthropod harvesting machine includes a frame; wheels connected to the frame for moving along the ground; an attachment surface supported by the frame and configured for being attached to by an arthropod; and an extermination section supported on the frame and configured for exterminating the arthropod on the attachment surface.

20 Claims, 5 Drawing Sheets ure is configured for being attached to by a tick.
THERMO-MECHANICAL DEVICE FOR CAPTURING AND EXTERMINATING TICKS The present disclosure claims priority of U.S. Provisional Patent Application No. 63/258,444, which is hereby incorporate-by-reference herein.

The present disclosure relates generally to an arthropod exterminating device, and specifically to a movable machine for capturing and exterminating ticks.

BACKGROUND

Ticks (Ixodida) are arthropods, more specifically parasitic arachnids, that feed on the blood of a living host, mainly mammals, including humans. During feeding, they can infect the host with serious diseases. The deer tick (*Ixodes pacificus*) is a vector for Lyme disease, which affects around 30,000 people annually in the USA, mainly in the northeastern states. The brown dog tick (*Ixodes ricinus*) is a vector for Rocky Mountain Spotted Fever, which affects around 5,000 people annually in the USA, mainly in the southern states. These diseases are rarely fatal, but they can be severely debilitating, and they can compromise long-term life-style.

The current approach to exterminate ticks is to apply a chemical pesticide, such as permethrin, to the affected area. However, this introduces a level of toxicity to the environment, and the practice is banned in many public areas, such as parks.

SUMMARY

A movable arthropod harvesting machine is provided including a frame; wheels connected to the frame for moving along the ground; an attachment surface supported by the frame and configured for being attached to by an arthropod; and an extermination section supported on the frame and configured for exterminating the arthropod on the attachment surface.

A movable arthropod harvesting machine is also provided that includes a frame; wheels connected to the frame for moving along the ground; an attachment surface supported by the frame and configured for being attached to by an arthropod; and an extermination section supported on the frame and configured for exterminating the arthropod on the attachment surface.

A method of constructing a movable tick harvesting machine is provided including mounting a tick killing device and a carbon dioxide source on a frame; rotatably mounting a plurality of wheel on the frame for contacting the ground; rotatably mounting a plurality of rollers on the frame; and wrapping a movable belt around the rollers such that the movable belt is drivable along the rollers with a first portion of the movable belt traveling horizontally with an attachment surface of the first portion of the movable belt facing the ground, and with a second portion of the movable belt traveling through the tick killing device. The attachment surface is configured for being attached to by a tick.

BRIEF DESCRIPTION OF THE DRAWINGS

The present disclosure is described below by reference to the following drawings, in which.

DETAILED DESCRIPTION

An approach that is safer than applying chemicals is provided by the present disclosure that is based on the natural behavior of ticks found in grass, which are arthropods, in order to effect their capture; and their vulnerability to hot, dry conditions for their extermination.

Ticks wait for a passing host by clinging to vegetation, such as blades of grass. Ticks then sense the proximity of their prey by a number of factors. They are attracted to a source of carbon dioxide, which is a component of exhaled breath from living creatures. Vibration is sensed to indicate movement of a potential host nearby. Mammals present a source of heat, to further confirm their presence.

When a potential host is close by, the tick detaches from its "questing", rest position and attaches to its host. For wild creatures this is initially to a surface of fur or feathers. For a human host, the initial attachment is typically to the fabric of clothing. The tick then crawls to an area of bare skin, where it can bite and feed.

The present disclosure provides a movable arthropod harvesting machine utilizing multiple factors for attraction of ticks: carbon dioxide gas; vibration from movement; and a source of heat. An attachment surface in the form of fabric surface is brushed over their habitat to encourage ticks to latch on. The fabric is in the form of a continuous belt, which then transports its passenger(s) into an infra-red oven.

Ticks require a moist environment for their survival. When exposed to dry heat, they rapidly dehydrate and die. Six minutes in a domestic clothes drier (at around 130° F.) will kill ticks. The oven, that is a component of the present disclosure, runs at much higher temperature (500° F., and higher), where the kill-time will be a fraction of a second.

Figure 1A:
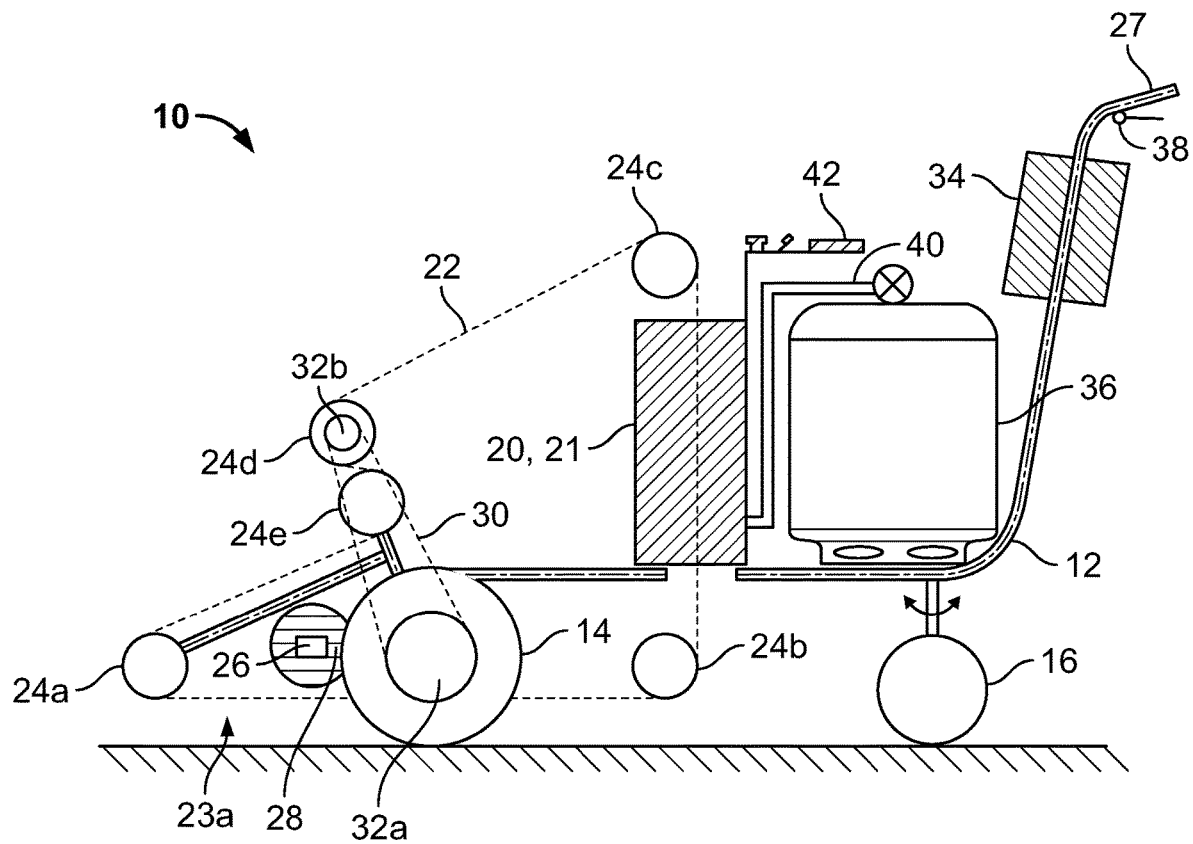
FIG. 1a shows a schematic side view of a movable arthropod harvesting machine in accordance with an exemplary embodiment of the present disclosure.

FIG. 1a shows a schematic side view of a movable arthropod harvesting machine 10 in accordance with an exemplary embodiment of the present disclosure. In this example, machine 10 is in the form of a self-propelled electric utility cart powered by a battery pack, which drives an electric trans-axle, as described in further detail in the following paragraphs.

For other self-powered exemplary embodiments, tractive effort could be provided by an internal combustion engine. The internal combustion engine can either drive the cart directly through a transmission, or power a generator, which in-turn would operate an electric traction motor in a series-hybrid configuration.

In other exemplary embodiments, the movable arthropod harvesting machine is not self-powered and can be provided as an add-on unit configured to be mounted on, or towed behind, a further vehicle including an existing piece of powered landscape equipment, such as a lawn mower or a garden tractor.

Movable arthropod harvesting machine 10 includes a frame 12 in the form of a tubular steel chassis, wheels 14, 16 connected to frame 12 for moving along the ground, an attachment surface 18 supported by frame 12 and configured for being attached to by an arthropod, in particular a tick. Front wheels 14, shod with pneumatic tires, are configured as part of a trans-axle assembly that house an electric motor 26. Motor 26 drives wheels 14 through reduction gears and a differential. Rear wheel 16 is configured as being a single-wheel rear support caster, which includes a solid rubber tire and supports the rear of the cart and permits steering by the operator through handlebars 27.

Machine 10 further includes an extermination section 20 supported on frame 12 and configured for exterminating the tick on the attachment surface 18. In the example in FIG. 1a, extermination section 20 is in the form of a heater 21.

Figure 1B:
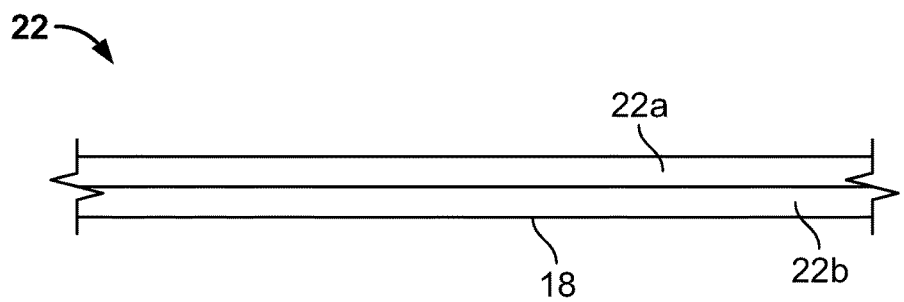
FIG. 1b shows a schematic side of the movable belt of the movable arthropod harvesting machine in accordance with an exemplary embodiment of the present disclosure.

Machine 10 also includes a movable belt 22 mounted movably on the frame and a plurality of rollers 24a to 24e rotatably mounted on frame 12. Movable belt 22 is wrapped around rollers 24a to 24 and includes attachment surface 18. As shown in FIG. 1b, movable belt 22 can include an inner layer 22a for traveling along outer surfaces of rollers 24a to 24e and an outer layer 22b including attachment surface 18. Inner layer 22a and outer layer 22b are made of different materials.

Belt 22 is advantageously formed of two layers 22a, 22b to provide belt 22 with three features: heat resistance to at least 500° F. withstand passage of belt 22 through heater 21, sufficient mechanical stability to track consistently through the web-path around rollers 24a to 24e and the ability to attract and attach ticks.

Both layers 22a, 22b exhibit thermal resistance to at least 500° F. The primary purpose outer layers 22b is to catch ticks and the primary purpose of inner layer 22a is to provide strength and mechanical stability for operating as a moving belt around rollers 24a to 24e.

In examples, inner layer 22a is formed of a rubber or a polymer and outer layer 22b is formed of natural fibers, synthetic fibers or a natural fiber/synthetic fiber blend.

In one specific example, outer layer 22b is a woven NOMEX fabric, A flame-resistant meta-aramid material, and inner layer 22a is a glass reinforced silicone rubber sheet. Silicone rubber also provides a surface with high friction coefficient in contact with the rollers, for positive drive and consistent tracking. In another specific example, the inner layer 22a is a tightly-woven NOMEX, duck fabric. In other examples, outer layer 22b can be a natural fiber in the form of one or more of cotton, wool or alpaca, a natural fiber/synthetic fiber blend in the form of a cotton/NOMEX blend, or synthetic fibers in the form of a polyester fabric layer.

A portion 23a of movable belt 22 is arranged substantially parallel to the ground, which is hereby defined as being angled at between 0 and 15 degrees with respect to the ground. In one preferred embodiment, portion 23a of belt 22 is angled at between 0 and 5 degrees with respect to the ground. Portion 23a is positioned horizontally between the two vertically lowest rollers 24a, 24b. Attachment surface 18 of portion 23a of the movable belt 22 faces the ground. Attachment surface 18 on the portion 23a of the movable belt 22 arranged parallel to the ground is spaced from a bottommost surface of at least one of the wheels by between 1 and 6 inches in the vertical direction to provide clearance from the ground, but also to be low enough to maximize the ability of ticks to effectively attach to attachment surface 18.

A bottommost surface of roller 24a and a bottommost surface of second roller 24b are each spaced from the bottommost surface of wheels 14 by between 1 and 6 inches in the vertical direction A second portion 23b of movable belt 22 passes through heater 21, which is configured for exterminating ticks on attachment surface 18 as the belt 22 passes through heater 21. Portion 23b of belt 22 is arranged substantially perpendicular to the ground and belt portion 23a, which is hereby defined as being angled at between 75 and 90 degrees with respect to the ground and belt portion 23a. In one preferred embodiment, portion 23b of belt 22 is angled at between 85 and 90 degrees with respect to the ground and belt portion 23a. Portion 23b is positioned vertically between the two vertically lowest rollers 24a, 24b.

Roller 24d is a drive-roller 6 and rollers 24a to 24c, 24e are idler rollers. Drive-roller 24d is adjustably mounted on frame 12 to adjust for height of drive-roller 24d to tension the belt or chain 30. Idler rollers 24b, 24c above and below heater 21 are crowned in profile to assist with keeping the fabric-belt 22 on track. The front roller 24a is carried on a spring loaded carriage that applies tension to the fabric-belt 22.

Movable arthropod harvesting machine 10 can further include a motor 26 for moving belt 22 along rollers 24a to 24e. Motor 26 is mounted coaxially on front wheels 14 on an axle 28 connecting wheels 14. Motor 26 is arranged for rotating wheels 14 and for simultaneously rotating roller 24d via a belt or chain 30 extending from a gear or pulley 32a on wheel 14 to a gear or pulley 32b on roller 24d. Motor 26 is an electric motor and machine 10 further includes a battery pack 34, for example an 82 V lithium-ion battery pack, powering the motor 26. In embodiments where the movable arthropod harvesting machine is not self-powered and is for example towed behind a vehicle, the machine 10 may not include a motor and the rotation of wheel 14 can drive the belt 22 via the traction-drive pulleys 32a, 32b and belt 30. In other embodiments, belt 22 can be decoupled from the traction-drive turning wheels 14, and can be driven by a further motor distinct from motor 26.

Movable arthropod harvesting machine 10 further includes a fuel source 36 configured for providing fuel to heater 21. Fuel source 36 forms a source for generating carbon dioxide because the fuel from fuel source 36 is converted into carbon dioxide upon combustion of the fuel within the heater 21. In a preferred embodiment, fuel source 36 is a propane tank 37 providing propane to heater 21, which is converted into carbon dioxide and water upon ignition of the propane by the heater 21.

Figure 2:
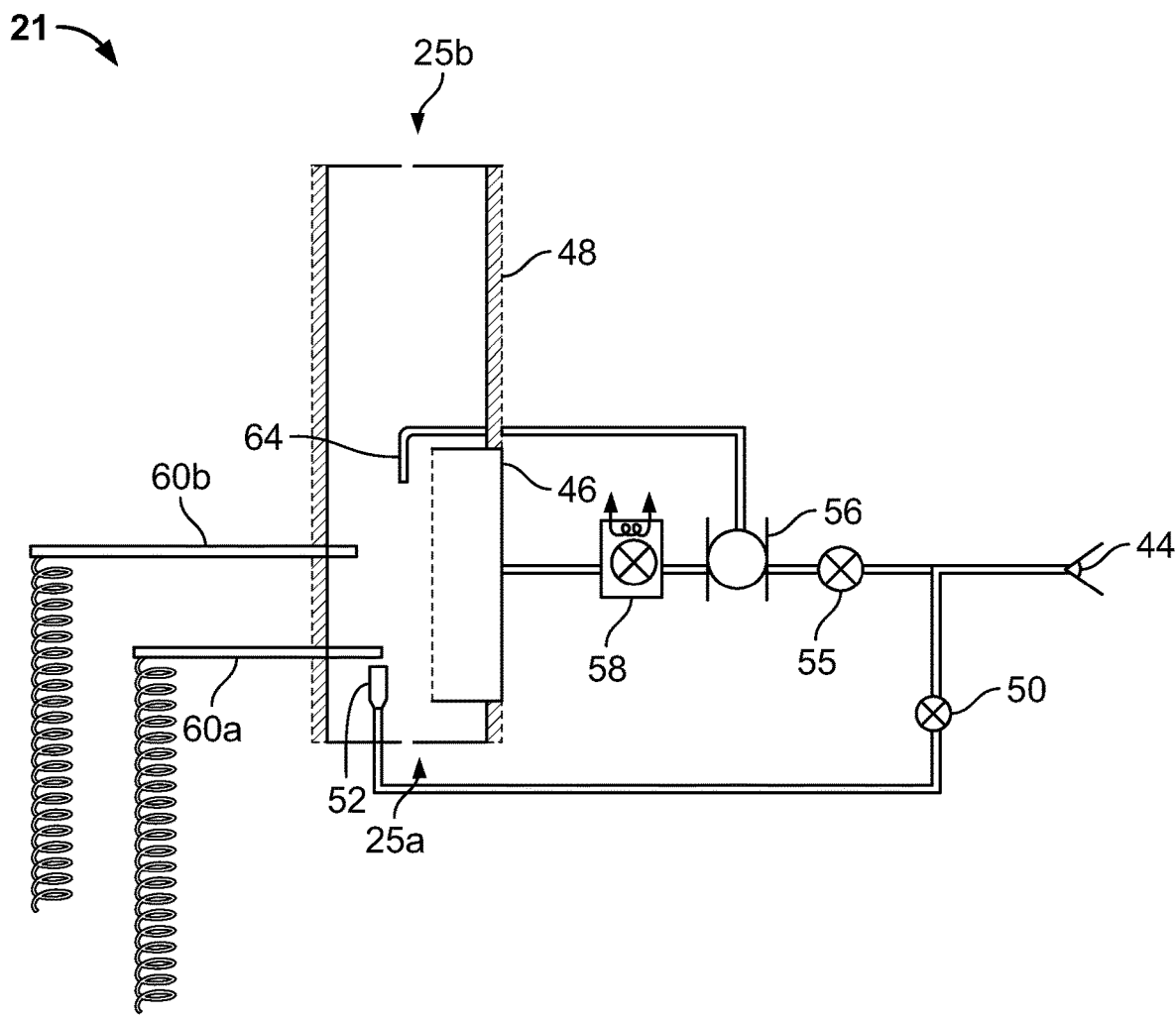
FIG. 2 schematically shows an example of a heater and a fuel line of the machine, illustrating the flow of propane to the heater in accordance with an exemplary embodiment of the present disclosure.

Fuel source 36 and heater 21 constitute the thermal basis of machine 10 and fuel source 36 supplies fuel to heater 21 via a fuel line 40, which as discussed further with respect to FIG. 2, can connect fuel source 36 and heater 21 together through a series of valves. Switches and indicators for controlling heater 21 and fuel source 36 can be mounted on a control panel 42, above fuel source 36, as discussed further with respect to FIG. 4.

FIG. 2 schematically shows an example of heater 21 and fuel line 40, illustrating the flow of propane 44 to heater 21. Heater 21 is configured as an oven and includes an infra-red heater section 46 heating the interior of an insulated, stainless steel oven enclosure 48. Enclosure 48 includes an entry opening 25a into which belt 22 enters into heater 21 and an exit opening 25b out of which belt 22 exits heater 21. In machine 10 shown in FIG. 1a, entry opening 25a is positioned vertically below exit opening 25b. Propane 44 flows from fuel source 36 (FIG. 1a) to infra-red heater section 46, which may include one or more heater platens. A side-branch of the supply feeds propane through a ball-valve 50 to a pilot-flame burner 52 in close proximity to the heater section 46. An electrode adjacent to pilot-flame burner 52 creates a spark when energized by a piezo igniter button 54 (FIG. 4), located externally on control panel 42 (FIG. 1a). At full output heater 21 can produces 28,000 BTU/hr (8.2 kW).

In an example in which heater section 46 includes three burners 52, the burners 52 can be mounted in-line across the width of the oven enclosure 48 (i.e., into the page in FIG. 2). The inputs of the three burners 52 can be tied together through a 3-way manifold, which is fed with propane by three valves in series. A manual shut-off valve 55 is followed by an adjustable thermostatic valve 56, and then an electrically activated solenoid valve 58.

The temperature of heater 21 in operation is monitored by two thermocouples 60a, 60b. A thermocouple 60a placed close to the pilot-flame indicates whether the flame is still burning. Another thermocouple 60b is placed in the interior of the oven enclosure 48, to indicate a general temperature inside enclosure 48. Both thermocouples 60a, 60b can be read by a 2-channel digital thermometer 62 (FIG. 4), which is mounted on the control panel 42. A liquid-bulb thermometer 64 configured for driving the thermostatic valve 56 is mounted above heater section 46 in the center of the oven enclosure 48.

Figure 3:
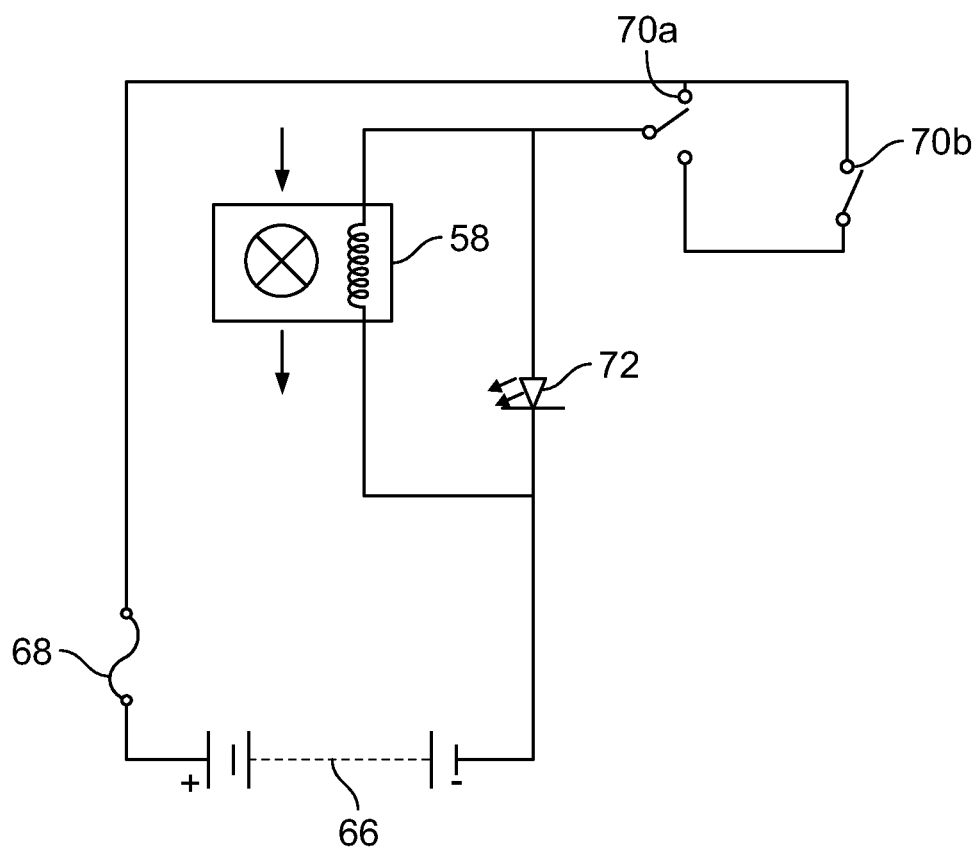
FIG. 3 schematically shows circuitry used to operate a solenoid valve that feeds propane to burners in the heater of the machine in accordance with an exemplary embodiment of the present disclosure.

FIG. 3 schematically shows the circuitry used to operate the solenoid valve 58 that feeds propane to the burners 52. The system is powered by an accessory, 12 V lead-acid battery 66. Battery 66 is mounted in a holder that is attached to a same base-plate of frame 12 as the fuel source 36. Power from battery 66 is supplied to the control circuitry through a fuse 68, which may be for example a 3 A fuse. Power is distributed via two switches 70a, 70b. Switch 70a is a three-position switch, which sets the mode of control. In the position shown in FIG. 3, the solenoid of valve 58 is turned on continuously. This mode is used during initial start-up of the machine 10 to purge air out of the gas lines before ignition. Once stable combustion is achieved, the switch position is changed to a standby position.

Switch 70b is a micro-switch placed under the thumb-throttle 38 on one of handlebars 27. Switch 70b connects to the solenoid valve 58 when the mode switch 70a is in the standby position. This ensures that the heat of heater 21 is only turned on—i.e., burners 52 are only turned on—when the machine 10 (and belt 22) are moving.

Figure 4:
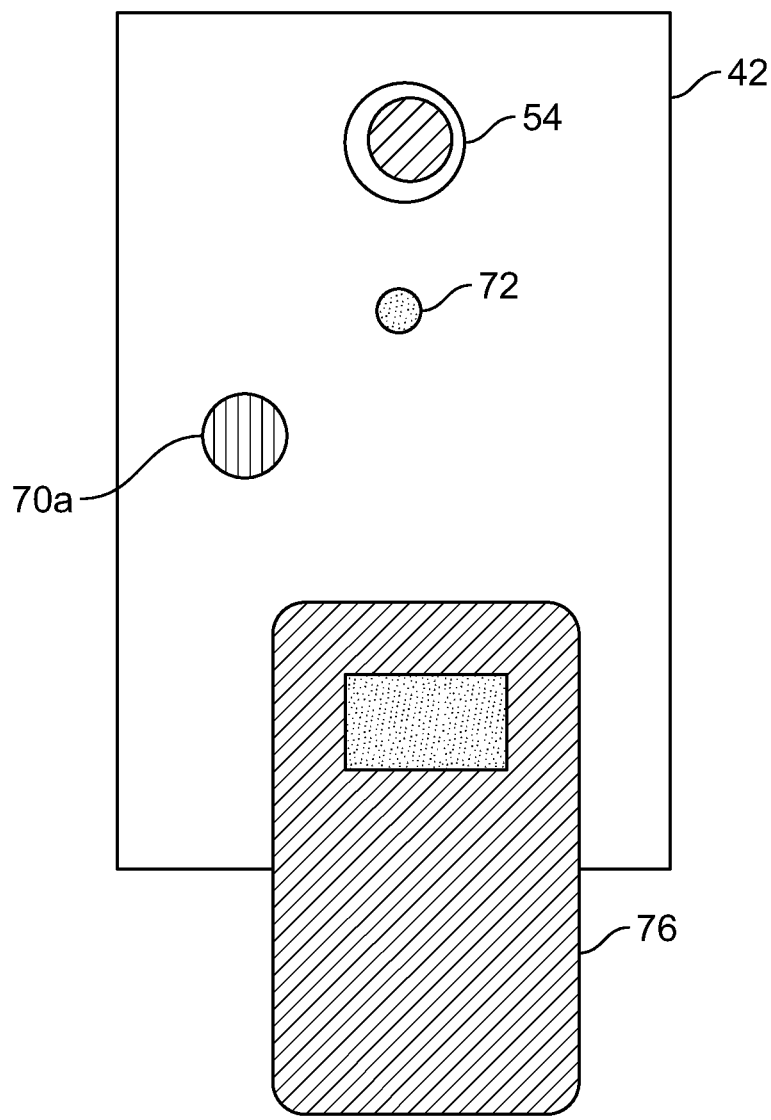
FIG. 4 schematically shows the layout of a control panel in accordance with an exemplary embodiment of the present disclosure.

FIG. 4 schematically shows the layout of the control panel 42. The "mode-select" switch 70a is to the left of a LED solenoid-valve-open indicator 72. Above indicator 72, panel 42 also includes piezo-igniter button 54 for the pilot light. A dual-channel thermocouple thermometer 76 is also mounted to the end of the panel.

A method of constructing movable tick harvesting machine 10 is also provided. The method includes mounting a tick killing device in the form of heater 21 and a carbon dioxide source in the form of fuel source 36 on frame 12. The method also includes rotatably mounting wheels 14, 16 on frame 12 such that wheels 14, 16 are arranged for contacting the ground, rotatably mounting rollers 24a to 24e on frame 12, mechanically connecting roller 24d to motor 26 and wrapping movable belt 22 around rollers 24a to 24e such that movable belt 22 is drivable along rollers 24a to 24e by motor 26 with first portion 23a of movable belt 22 traveling horizontally with attachment surface 28 of portion 23a of movable belt 22 facing the ground, and with second portion 23b of movable belt 22 traveling through tick killing device 20. In other words, rollers 24a to 24e are rotatably mounted on frame 12 to drive movable belt 22 in a loop under frame 12 such attachment surface 18 of portion 23a of movable belt 22 faces the ground.

The operator walks behind machine 10, holding on to handlebars 27, and controls speed with a thumb-operated throttle switch 38.

Figure 5:
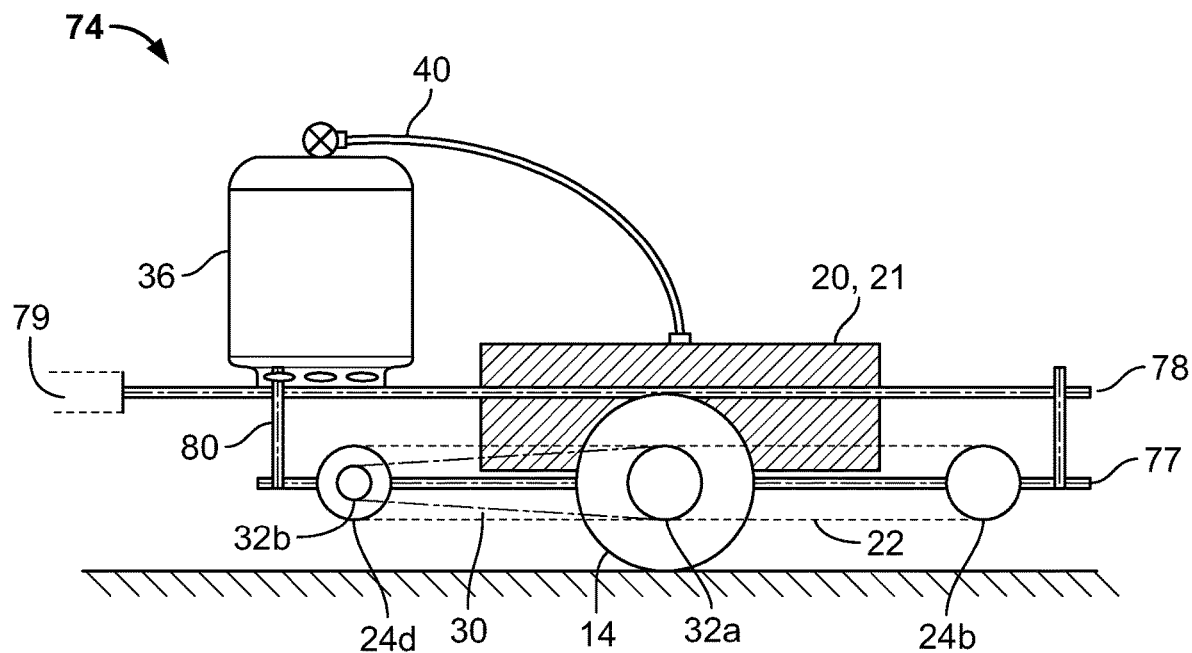
FIG. 5 shows a schematic side view of a movable arthropod harvesting machine in accordance with another exemplary embodiment of the present disclosure.

FIG. 5 shows a schematic side view of a movable arthropod harvesting machine 110 in accordance with another exemplary embodiment of the present disclosure. Machine 110 is configured for being towed behind a vehicle. In the same manner as machine 10, machine 110 includes a fuel source 36, a tick killing device 20 in the form of a heater 21, a belt 22, pulleys 32a, 32b and a belt or chain 30.

Machine 110 includes two rollers 24b, 24d— drive roller 24d and idler roller 24b, with rollers 24b, 24d being aligned in a horizontal relationship and substantially parallel to one another such that first portion 23a of movable belt 22, in the same manner as with machine 10, is arranged substantially parallel to the ground. In one preferred embodiment, portion 23a of belt 22 is angled at between 0 and 5 degrees with respect to the ground. Roller 24b is sprung to provide tension to the belt 22, and may be laterally adjustable to keep the belt 22 centered. Both rollers 24b, 24d are crowned for guiding belt 22.

Like in machine 10, second portion 23b of movable belt 22 passes through heater 21, but instead of the vertical orientation of second portion 23b in machine 10, in machine 110 portion 23b is arranged substantially parallel to the ground and belt portion 23a and portion 23b is positioned horizontally between rollers 24b, 24d. In one preferred embodiment, portion 23b of belt 22 is angled at between 0 and 5 degrees with respect to the ground.

Heater 21 of machine 110 is arranged differently than that of machine 10, such that portion 23b of belt 22 passes horizontally through heater 21. Accordingly, entry opening 25a and exit opening 25b (FIG. 2) are arranged substantially parallel with respect to each other.

Machine 110 further includes a frame 74 including a sub-frame 77 that is hung below a trailer chassis 78, which has a trailer-hitch 79 for towing. The sub-frame 77 can be set for height by its hangers 80. The propane tank 36 is carried on the main chassis 78.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A movable arthropod harvesting machine comprising:
   a frame;
   wheels connected to the frame for moving along a ground;
   an attachment surface supported by the frame and configured for being attached to by an arthropod while the attachment surface is directly facing and spaced above the ground;
   an extermination section supported on the frame and configured for exterminating the arthropod on the attachment surface as the attachment surface is moved through the extermination section,
   the extermination section being a heater configured for heating the attachment surface of at least 500° F. as the attachment surface passes through the heater, the attachment surface being a fabric having a thermal resistance of at least 500° F.;

a movable belt enters the heater at an entrance opening and exits the heater at an exit opening, and a plurality of rollers, wherein the heater being positioned between a first roller of the plurality of rollers and a second roller of the plurality of rollers such that the movable belt passes along the first roller before entering the heater and passes along the second roller after exiting the heater.

2. The machine as recited in claim 1 further comprising the movable belt mounted movably on the frame, the movable belt including the attachment surface.

3. The machine as recited in claim 2 wherein a portion of the movable belt at which the attachment surface is directly facing and spaced above the ground is arranged substantially parallel to the ground.

4. The machine as recited in claim 3 wherein the attachment surface on the portion of the movable belt arranged substantially parallel to the ground is spaced from a bottommost surface of at least one of the wheels by between 1 and 6 inches in a vertical direction.

5. The machine as recited in claim 2 further comprising the plurality of rollers rotatably mounted on the frame, the movable belt being wrapped around the rollers.

6. The machine as recited in claim 5 wherein the movable belt includes an inner layer for traveling along surfaces of the rollers and an outer layer including the attachment surface, the inner and outer layers being made of different materials.

7. The machine as recited in claim 6 wherein the inner layer is formed of a rubber or a polymer and the outer layer is formed of natural fibers or synthetic fibers.

8. The machine as recited in claim 5 further comprising a motor for moving the belt along the rollers.

9. The machine as recited in claim 8 wherein the motor is mounted coaxially on at least one of the wheels and is arranged for rotating at least one of the wheels and for rotating one of the rollers.

10. The machine as recited in claim 8 wherein the motor is an electric motor, the machine further comprising a battery powering the motor.

11. The machine as recited in claim 2 wherein the movable belt passes through the heater, the heater configured for exterminating the arthropod on the attachment surface as the belt passes through the heater.

12. The machine as recited in claim 1 further comprising a fuel source, the extermination section including the heater and the fuel source configured for providing fuel to the heater, the fuel being converted into carbon dioxide upon combustion of the fuel.

13. The machine as recited in claim 12 wherein the fuel source is propane tank.

14. A movable arthropod harvesting machine comprising:
a frame;
wheels connected to the frame for moving along a ground;
an attachment surface supported by the frame and configured for being attached to by an arthropod while the attachment surface is directly facing and spaced above the ground;
a heater configured for exterminating the arthropod on the attachment surface as the attachment surface is moved through the heater;
a source for generating carbon dioxide, the heater configured for heating the attachment surface of at least 500° F. as the attachment surface passes through the heater, the attachment surface being a fabric having a thermal resistance of at least 500° F.;
a movable belt enters the heater at an entrance opening and exits the heater at an exit opening, and
a plurality of rollers, wherein the heater being positioned between a first roller of the plurality of rollers and a second roller of the plurality of rollers such that the movable belt passes along the first roller before entering the heater and passes along the second roller after exiting the heater.

15. The machine as recited in claim 14 wherein the source supplies fuel to the heater, the carbon dioxide being generated upon ignition of the fuel by the heater.

16. The machine as recited in claim 14 wherein the temperature of the heater is at least 500° F.

17. The machine as recited in claim 14 further comprising the movable belt and the plurality of rollers, the movable belt includes the attachment surface, the rollers being rotatably mounted on the frame to drive the movable belt in a loop under the frame such the attachment surface of a portion of the movable belt faces the ground and a portion of the belt passes through the heater.

18. The machine as recited in claim 17 wherein the plurality of rollers includes the first roller and the second roller, the portion of the movable belt with the attachment surface facing the ground being between the first roller and the second roller, a bottommost surface of the first roller and a bottommost surface of the second roller each being spaced from a bottommost surface of at least one of the wheels by between 1 and 6 inches in the vertical direction.

19. The machine as recited in claim 14 wherein the machine is configured such that the attachment surface travels above grass and arthropods in the grass are attracted to the machine by the source for generating carbon dioxide and attach to the attachment surface.

20. A movable arthropod harvesting machine comprising:
a frame;
wheels connected to the frame for moving along a ground;
a plurality of rollers rotatably mounted on the frame;
a movable belt wrapped around the rollers, the movable belt including an attachment surface supported by the frame and configured for being attached to by an arthropod while the attachment surface is directly facing and spaced above the ground; and
a heater supported on the frame and configured for exterminating the arthropod on the attachment surface as the attachment surface is moved through the extermination section,
such that the movable belt enters the heater at an entrance opening and exits the heater at an exit opening, and
the heater being positioned between a first roller of the rollers and a second roller of the rollers such that the movable belt passes along the first roller before entering the heater and passes along the second roller after exiting the heater.

* * * * *